(12) United States Patent
Herskedal et al.

(10) Patent No.: US 8,607,321 B2
(45) Date of Patent: Dec. 10, 2013

(54) IDENTIFICATION OF A SMART CARD ON A PLUG AND PLAY SYSTEM

(75) Inventors: Eirik Herskedal, Issaquah, WA (US); Pieter Retief Kasselman, Dublin (IE); Salvatore Francomacaro, Redmind, WA (US); Xiaohong Su, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 12/163,153

(22) Filed: Jun. 27, 2008

(65) Prior Publication Data

US 2009/0328179 A1 Dec. 31, 2009

(51) Int. Cl.
*G06F 21/00* (2013.01)

(52) U.S. Cl.
USPC .............................................. 726/9; 717/174

(58) Field of Classification Search
USPC ............................................................ 726/9
See application file for complete search history.

(56) References Cited

U.S. PATENT DOCUMENTS

| | | | |
|---|---|---|---|
| 6,199,114 B1 | 3/2001 | White et al. | |
| 6,237,848 B1 | 5/2001 | Everett | |
| 6,484,259 B1 | 11/2002 | Barlow | |
| 6,698,654 B1 * | 3/2004 | Zuppicich | 235/380 |
| 6,847,948 B1 | 1/2005 | Paolini et al. | |
| 7,082,614 B2 | 7/2006 | Bender | |
| 7,165,727 B2 | 1/2007 | de Jong | |
| 2004/0256451 A1 | 12/2004 | Goman et al. | |
| 2008/0041951 A1 | 2/2008 | Adams et al. | |

OTHER PUBLICATIONS

SmartCard Alliance "Contactless SmartChip Technology: The Business Benefits", Dec. 30, 2006 from Internet Archive WayBack Machine, pp. 1-5. http://www.smartcardalliance.org/resources/pdf/contactless_business_benefits.pdf.*

"Developing with the ICardInitialization Interface", retrieved on Apr. 21, 2008 at <<http://msdn2.microsoft.com/en-us/library/bb468095(VS.85).aspx>>, Microsoft Corporation, 2008, pp. 1-4.

"Smart Card Minidriver Specification for Windows Base Cryptographic Service Provider (Base CSP) and Smart Card Key Storage Provider (KSP)", retrieved at <<http://download.microsoft.com/download/9/c/5/9c5b2167-8017-4bae-9fde-d599bac8184a/sc_minidriver_specs_V5.doc>>, Sep. 12, 2007, pp. 1-56.

Tanwongsval, "Sun Ray Thin-Client and Smart Cards: An Old Concept with New Muscle", retrieved at <<http://www.sun-rays.org/lib/sans-ray,pdf>>, SANS Institute 2002, Apr. 5, 2002, pp. 1-13.

Toji, et al., "A Multi-card Architecture for Smart Card Management Systems", retrieved at <<http://www.ntt.co.jp/tr/0309/files/ntr200409070.pdf>, NTT Technical Review, vol. 1, No. 6, Sep. 2003, pp. 70-75.

* cited by examiner

*Primary Examiner* — Lisa Lewis
(74) *Attorney, Agent, or Firm* — Lee & Hayes, PLLC

(57) ABSTRACT

Techniques for identifying a smart card in a plug and play system. The technique requires identifying a unique code identifier and loading a smart card minidriver according to the unique code identifier.

20 Claims, 5 Drawing Sheets

IDENTIFICATION OF A SMART CARD ON A PLUG AND PLAY SYSTEM

CROSS REFERENCES TO RELATED APPLICATIONS

The present application is related to commonly assigned co-pending U.S. patent application Ser. No. 12/163,635, entitled, "Filter Driver to Enumerate Smartcard Nodes for Plug and Play", to Herskedal et al., filed on Jun. 27, 2008, and U.S. patent application Ser. No. 12/163,646, entitled, "Simulation of Smartcard Removal and Reinsertion", to Herskedal et al., filed on Jun. 27, 2008, which are incorporated by reference herein for all that they teach and discloses.

BACKGROUND

Smart cards are portable devices that include an embedded integrated circuit. Smart cards may be passive memory devices or contain a microcontroller and associated memory for various functions. Smart card form factors include plastic cards, fobs, subscriber identification modules (SIMs), and the like. Applications for smart cards include payment systems, access control, identification, cryptographic controls and authentication in a Windows based system, and telecommunications.

Traditionally, within a Windows based system, such as a plug and play system, a smart card and a smart card reader communicate by way of answer to reset (ATR). Based upon the identified ATR, Windows would load the correct cryptographic service provider or smart card minidriver.

With the introduction of the Windows Smartcard Framework (WSF) and the anticipated future evolution of the WSF, as well as the smart card industry as a whole, the existing use of the ATR identification method may no longer be sufficient to determine which cryptographic service provider (CSP) or smart card minidriver to load for a specific smart card. Deficiencies of the use of the ATR identification method become even more apparent when the smart card contains multiple applications. The existing ATR identification method does not provide a way for the multiple applications on the smart card to be identified. In addition, further complications may arise when contactless smart cards are considered. Therefore, it is desirable to find ways to improve upon these deficiencies.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, this disclosure describes various exemplary methods and systems for identifying a smart card on a plug and play system. In an exemplary implementation, the smart card is inserted into a smart card reader. Upon insertion, the smart card is identified using a get data command. Utilizing the get data command, the appropriate card minidriver is loaded.

An exemplary system is described including one or more processors and a memory, and is configured to identify the smart card on a plug and play system. The identification of the smart card on the plug and play system provides a common way to access smart card features, despite the smart card type and despite the number of applications present on the smart card.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for identifying a smart card on a plug and play system. The technique requires identifying a unique identifier and loading a smart card minidriver according to the unique identifier. This technique provides a common way to identify and access smart card features, regardless of card type and the number of applications on the smart card.

Figure 1:
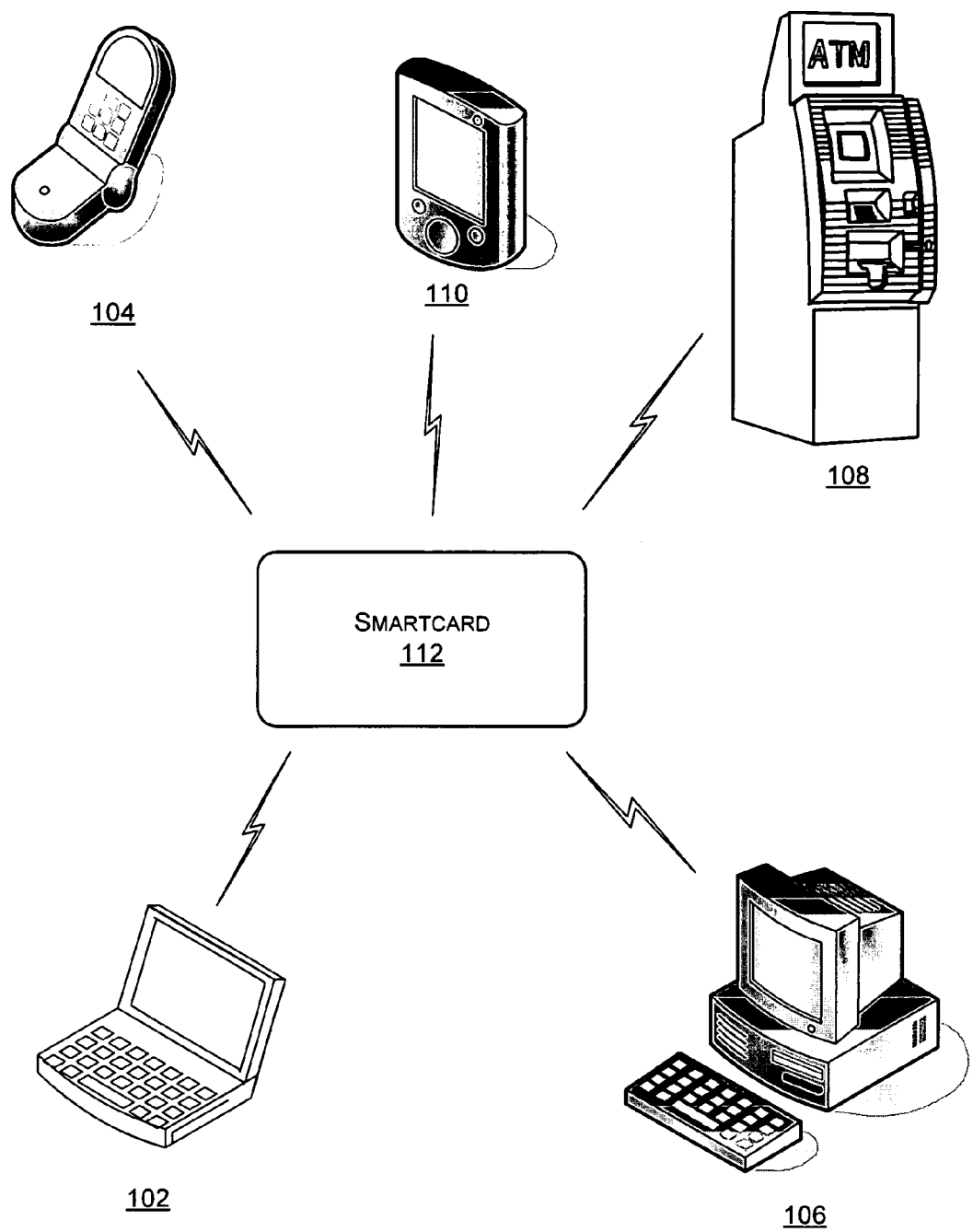
FIG. 1 illustrates exemplary devices utilizing a smart card known in the art.

FIG. 1 shows exemplary devices which may include a plug a play feature. Exemplary devices include, without limitation, a laptop computer 102, a cellular phone 104, a desktop computer 106, an automated teller machine (ATM) 108, a personal digital assistant (PDA) 110, and the like. A plug and play feature permits the addition of a new device without requiring the reconfiguration or manual installation of a driver to the original device. Typically, a new device such as a hardware device, contains a unique identifier. The unique identifier enumerates and implements the new device. However, unlike other hardware devices, a smart card 112 does not contain a hardware identifier. Therefore, when a smart card is connected to a device, such as those listed above, the smart card may be blocked from subsequently accessing the necessary drivers and or applications necessary to be fully implemented in a system.

Exemplary System

The following discussion of an exemplary system provides the reader with assistance in understanding ways in which various subject matter aspects of the system, methods, and computer program products may be employed. The system described below constitutes but one example and is not intended to limit application of the subject matter to any one particular operating system.

Figure 2:
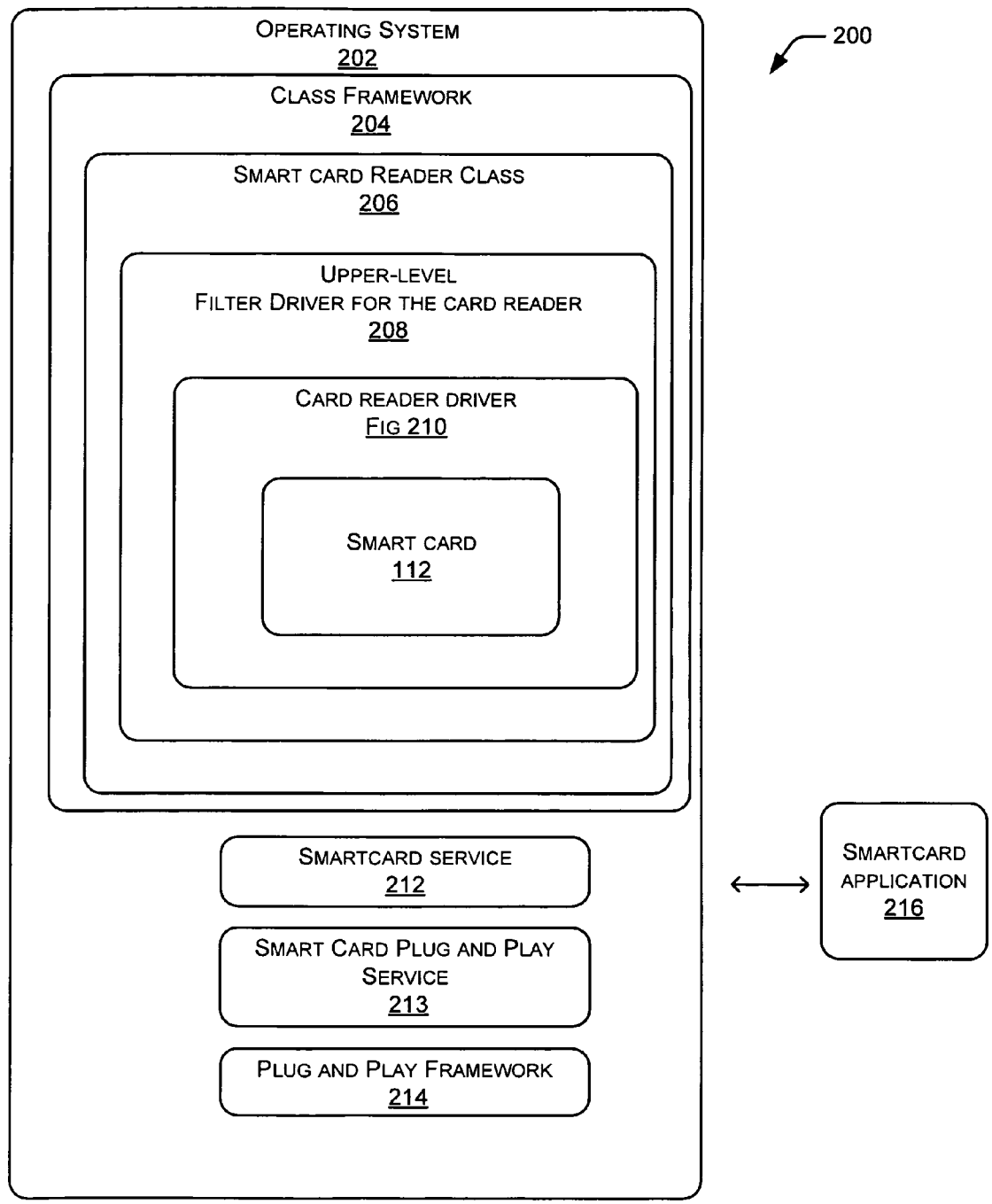
FIG. 2 illustrates a block diagram for an exemplary system utilizing a smart card.

FIG. 2 is a schematic diagram illustrating an exemplary system implementing a smart card in an operating environment 200. Depicted is an operating system 202. Exemplary operating systems include, without limitation, Windows 2000™, Windows XP™, Windows Vista™, Windows Mobile®, Linux and derivatives, Mac OS™, AIX™, and the like. Within the operating system 202 there is a class framework 204, which provides a hierarchy of component objects. The class framework provides for various classes of objects within the operating system 202, including, without limitation, monitors, network adapters, smart cards, and the like.

Within the class framework 204 there is a smart card reader class 206 including an upper-level filter driver 208. An upper-level filter driver is a driver that modifies and extends the behavior of subordinate objects. Because a filter driver provides this ability to modify behavior of subordinate objects while continuing to pass through commands, the filter driver provides an ideal way to seamlessly add functionality. The upper-level filter driver 208 includes a smart card reader 210.

A smart card service 212 manages resources of the smart card. For example, in an operating system such as Microsoft Windows, a smart card service may include, without limitation, a SCardSvr service running within a SVCHost. The smart card service provides the basic infrastructure utilized by other smart card components, and may manage a smart card reader on an operating system and the operating system application interactions.

A smart card service 212, a smart card plug and play service 213, and a plug and play framework 214 are included within the operating system 202. The smart card plug and play service 213 may detect and identify the smart card 112. According to the identification, the plug and play framework 214 may install the components typically required to render the smart card fully functional. The necessary components may include, without limitation, an appropriate smart card minidriver, an application software, or if necessary, both the smart card minidriver and the application software.

The operating system 202 and the operating system components may communicate with the smart card application 216. Smart card applications may include, without limitation, displaying available balance information in a stored-value smart card, storing or retrieving medical data to the smart card, and the like.

Figure 3:
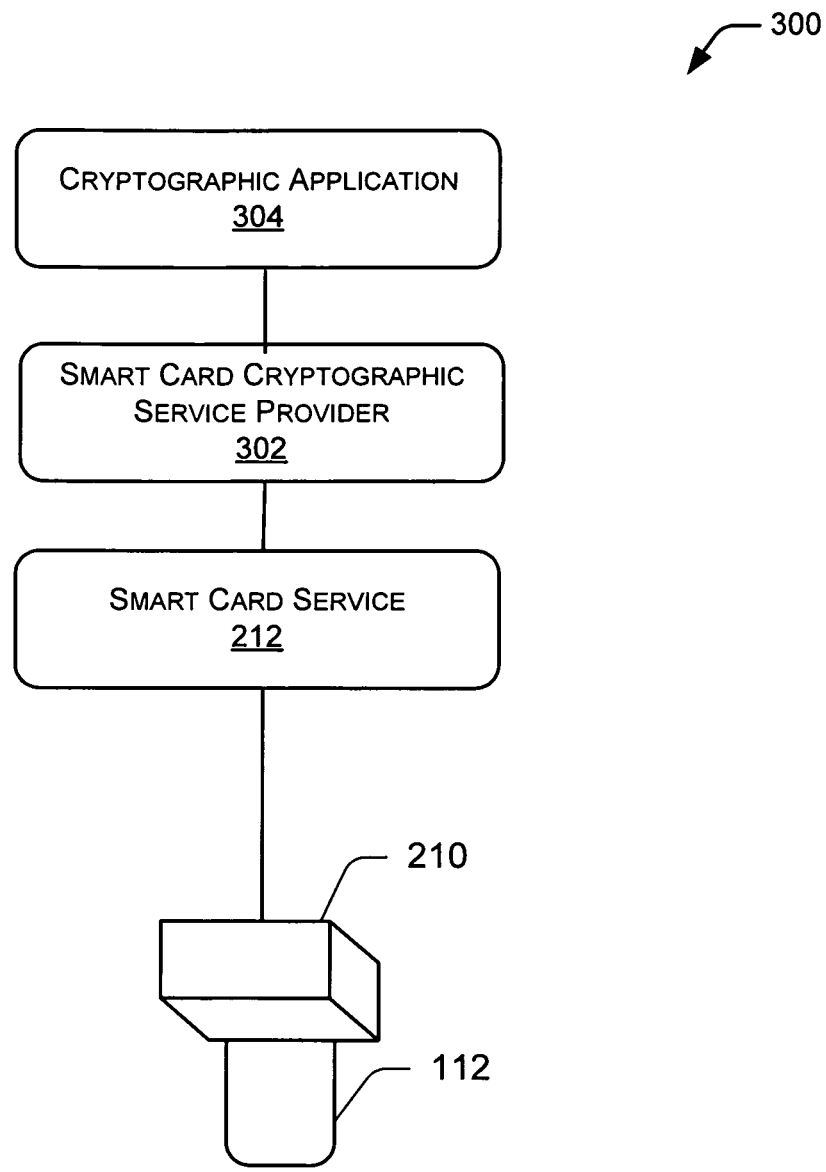
FIG. 3 further illustrates a block diagram for a smart card system according to FIG. 2.

FIG. 3 illustrates a smart card system 300 for identification of a smart card 112 within operating system 202. The smart card application 216 may be present within the operating system 202 as an operating system component such as a cryptographic service provider (CSP) 302, or have components present both within the operating system as well as in an application space.

The cryptographic foundation that smart card 112 relies on in a Windows™ based operating system is a layered foundation. The above described system requires a CSP that knows how to communicate with the smart card 112 and therefore fully implement the smart card. Examples of cryptography applications 304 for the smart card 112 include, without limitation, legacy Cryptography API (also referred to as CryptoAPI or CAPI) as well as the Cryptography API Next Generation (CNG) in Microsoft Windows Vista™.

Identifying a Smart Card in an Exemplary Operating System

As stated above, smart cards do not necessarily contain a hardware identifier that is unique to that smart card. As a result, identifying a smart card in a Windows based operating system containing a smart card plug and play service is difficult to accomplish utilizing a single approach. Therefore, the smart card 112 may be identified using one or more identification techniques. In one implementation, the smart card may follow a sequence of three identification techniques including, without limitation: 1) a get data command, 2) an elementary file ATR, and 3) use of historical bites. In another implementation these three identification techniques are utilized in no particular sequence.

When identification of the smart card 112 is completed the sequence is terminated and the corresponding smart card minidriver, also known as a card module, is loaded. The smart card minidriver is an interface layer between a vendor's smart card and the relevant Windows smart card cryptography provider, described above. A smart card minidriver may include, without limitation, a user mode component which plugs into the CSP.

In one implementation, to access the cryptographic application 304, a smart card vendor provides the smart card minidriver necessary to enable the specific smart card to communicate with the CSP. When the smart card 112 is inserted into the card reader 210, the smart card 112 is identified using one of the techniques discussed herein. Once the smart card 112 is identified, the smart card 112 may plug into the CSP utilizing the smart card minidriver provided without requiring the smart card vendor to implement functions of the CSP. A user is thereby permitted to access the contents, including both hardware and software, of the smart card 112. In another implementation, to access the cryptographic application 304, the smart card minidriver necessary to enable the smart card may be present on the operating system 202.

Exemplary Process

Figure 4:
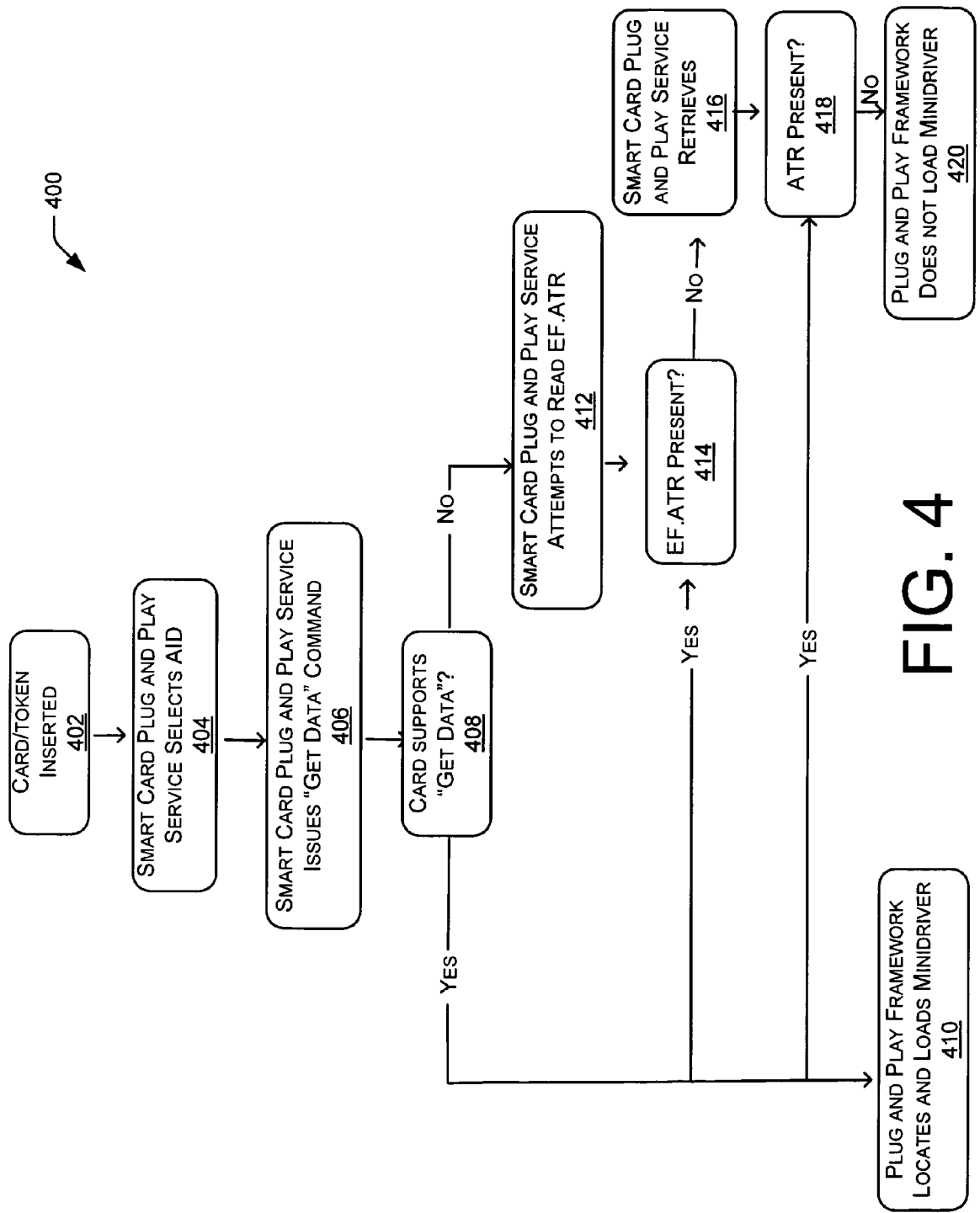
FIG. 4 is a flow diagram that describes a process for identifying a smart card according to one embodiment.

FIG. 4 is an overview flowchart of exemplary processes for identifying a smart card in a plug and play system. For ease of understanding, the method 400 is delineated as separate steps represented as independent blocks in FIG. 4. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible that one or more of the provided steps may be omitted.

FIG. 4 shows a process 400 for identification of a smart card in operating system 202 containing the plug and play framework 214. The smart card is inserted into the reader at block 402. At block 404, the smart card plug and play service may attempt to select an application using the application ID (AID), defined for a specific MS application. If the smart card does not support the specified AID, the smart card should return an error message and the smart card plug and play service may issue an empty "select" command. If the smart card does not support the specified AID, and therefore the ability to load the requisite smart card minidriver, the smart card plug and play service may attempt to identify which smart card minidriver to load by implementing a sequence of queries.

The first query at block 406 may be a "Get Data" query. The "Get Data" query may be issued using a command with a Windows tag. In one implementation, this tag may be any tag reserved by ISO-7816-6, such as 7F 69, and may be implemented at the operating system level or at the application level. In another implementation, the tag may be a non ISO reserved tag.

If the card supports the "Get Data" command, then a list of one or more unique identifiers are returned at block 408, where the first unique identifier may be used to locate and install the appropriate smart card minidriver. The format of data that may be returned in response to the "Get Data" command may be used as follows:

```
CardID : : = SEQUENCE {
            Version Version DEFAULT v1,
            Vendor VENDOR OPTIONAL,
            Guids GUIDS }
Version : : = INTEGER {v1(0), v2(1), v3(2)}
VENDOR : : IA5STRING (SIZE(0..8))
GUID : : = OCTET STRING (SIZE(16))
GUIDS : : = SEQUENCE OF GUID
```

In the above byte array example the version is O, and the vendor may be Microsoft. In one implementation the GUID maybe a 16-byte global unique identifier that uniquely identifies the smart card and the application combination used to determine and load the appropriate smart card minidriver at block 410. In other implementations, the GUID contains more or less than a 16-byte GUID. An example device ID may be:

SCFILTER\CID_F6C71208-78F7-48AD-AE8A-9DC6D6F9BAE8

In this example SCFILTER is a smart card filter, CID is a card ID, and the remaining numbers are the GUID. The SCFILTER\CID portion of the device ID is a static portion indicating which virtual bus a smart card node may be enumerated on.

Some additional abstract syntax notation one (ASN.1) data that may be returned by the "get data" command include, without limitation: 0x30, 0x2C, 0x16, 0x04, 0x4D, 0x53, 0x46, 0x54, 0x30, 0x24, 0x04, 0x10, 0x00, 0x01, 0x02, 0x03, 0x04, 0x05, 0x06, 0x07, 0x08, 0x09, 0x0A, 0x0B, 0x0C, 0x0D, 0x0E, 0x0F, 0x04, 0x10, 0x10, 0x11, 0x12, 0x13, 0x14, 0x15, 0x16, 0x17, 0x18, 0x19, 0x1A, 0x1B, 0x1C, 0x1D, 0x1E, 0x1F. The tags that are in italics are 0x30=SEQUENCE, 0x16=IA5String, and 0x04=OCTET String. The tags that are in bold describe various byte buffer lengths. The tags that are underlined above are hex encoding of Microsoft. And, the remaining tags listed above are the actual GUIDs used for identification.

In one implementation, ASN.1 is typically Tag-Length-Value. Therefore, a SEQUENCE tag followed by 2C worth of data, followed by a IA5String tag, followed by 4 bytes of data, then another sequence tag followed by 0x24 bytes of data, then two octet strings each of 0x10 bytes of data would return and use the first GUID. However, in other implementations, the smart card may return multiple GUIDs indicating that the smart card is permitted to talk to multiple software hosts.

If the smart card does not support the "Get Data" command, the smart card plug and play service may attempt to determine which smart card minidriver to load by inspecting the EF.ATR file if, available, on the smart card at step 412. The ATR progresses through five steps; 1) an initial character, 2) a format character, 3) an interface character, 4) historical bytes, and 5) a check character. The smart card plug and play service may determine if an EF.ATR file is present at step 412 by inspecting the historical bytes of the ATR. The smart card must indicate that a BER-TLV structure is present in the EF.ATR and the EF.ATR file must be a transparent file. The smart card plug and play service may access the EF.ATR through the following commands:

Perform a "SELECT" command to select the MF
Perform a SELECT command to select the EF.ATR file
Perform a "READ BINARY" command on the currently selected files.

The smart card plug and play service may search the returned bytes for the unique identifier, while the remaining bytes may be ignored. The BER-TLV byte returned as a result of an EF.ATR search is typically similar to that described above for the "Get Data" command. For example:

```
CardID :: = SEQUENCE {
        Version Version DEFAULT v1,
        Vendor VENDOR,
        Guids GUIDS}
Version :: = INTEGER [v1 (0), v2(1), v3(2)}
VENDOR :: = IA5STRING (SIZE (0..8))
GUID :: = OCTET STRING (SIZE (16))
GUIDS :: = SEQUENCE OF GUID
```

As with the "Get Data" command, the 16 byte GUID identifies the smart card and the application combination and may be used to detect and load the appropriate smart card minidriver at step 402. In one implementation, the EF.ATR command is used for contactless smart cards. In another implementation the EF.ATR may be used for other types of smart cards.

If the smart card 112 does not support the "GET DATA" method or contain the EF.ATR file the smart card plug and play service may revert to attempting to retrieve the historical bytes in the ATR to determine which smart card minidriver to load at step 416. At step 418 the smart card plug and play service determines if an ATR is present on the smart card. Matching may be done on the full set of historical bytes. For example:

ATR: 3b 16 96 41 73 74 72 69 64
Historical bytes: 41 73 74 72 69 64
Card ID: SCFILTER\CID_417374726964

The use of historical bytes is not compatible with contactless smart cards. Therefore, in one implementation, a contactless smart card which is unable to be identified using the "Get Data" command or the EF.ATR may not be able to be identified using the identification process described above. In another implementation, the contactless card may be identified using another technique.

If the smart card plug and play service is unable to identify the smart card using the "Get Data" command, the EF.ATR, or the historical bytes of the ATR, then the load the smart card minidriver is not loaded at step 420 and the smart card is not identified by the system.

Computing Environment

Figure 5:
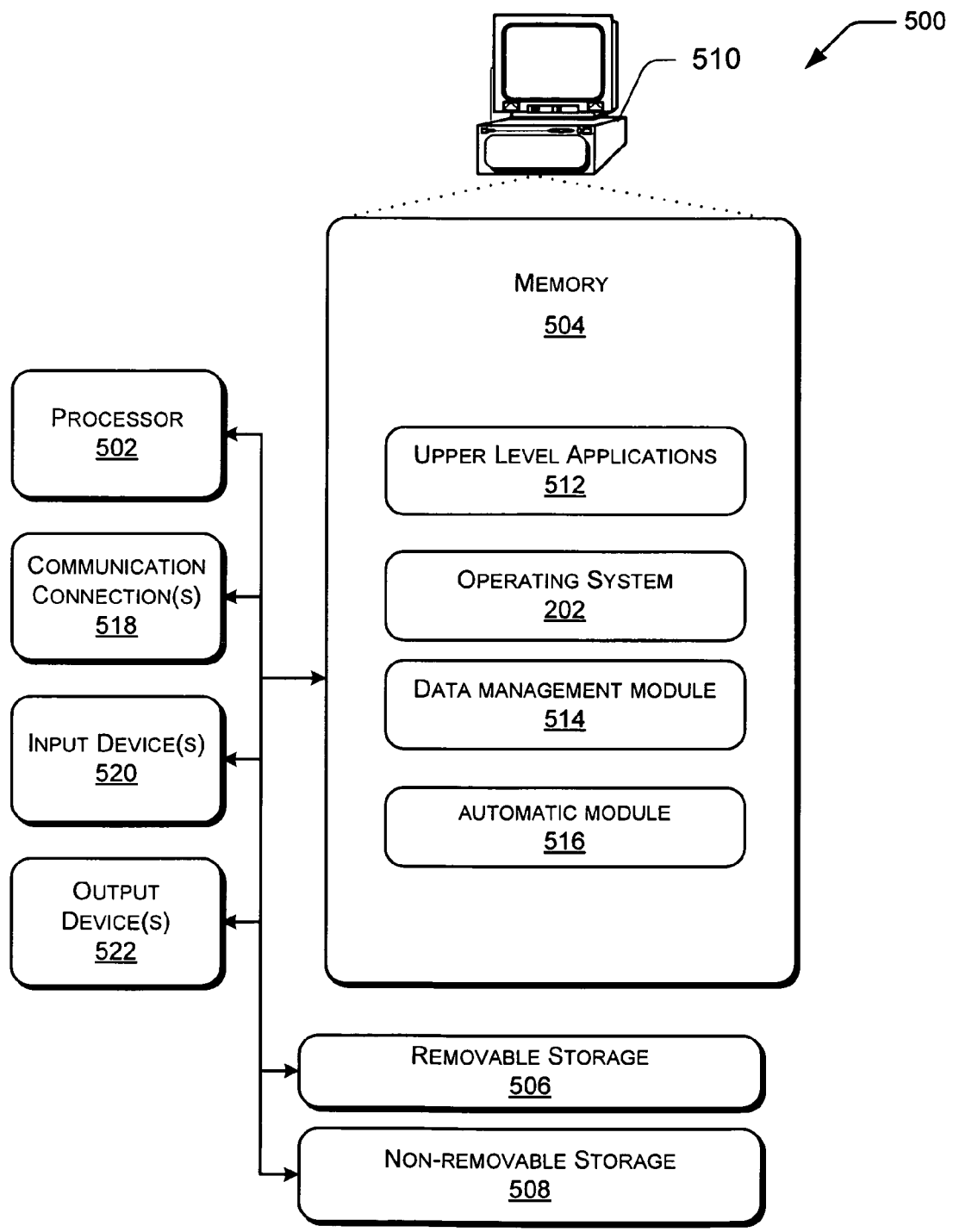
FIG. 5 illustrates a block diagram for an exemplary computing environment.

FIG. 5 shows an exemplary computing system 500 suitable as an environment for practicing aspects of the subject matter, for example to host an exemplary operating system 202. The system 500 may be configured as any suitable system capable of implementing the operating system 202. In one exemplary configuration, the system comprises at least one processor 502 and memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The system may also include additional removable storage 506 and/or non-removable storage 508 including, but not limited to, magnetic storage, optical disks, and/or tape storage. The disk drives and their associated computer-readable medium may provide non-volatile storage of computer readable instructions, data structures, program modules, and other data for the communication devices.

Memory 504, removable storage 506, and non-removable storage 508 are all examples of the computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 510.

Turning to the contents of the memory 504 in more detail, may include an upper level application 512 and an operating system 202. For example, the system 500 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 504 includes the operating system 202, a data management module 514, and an automatic module 516. The data management module 514 stores and manages storage of information, such as images, ROI, equations, and the like, and may communicate with one or more local and/or remote databases or services. The automatic module 516 allows the process to operate without human intervention.

The system 500 may also contain communications connection(s) 518 that allow processor 502 to communicate with servers, the user terminals, and/or other devices on a network. Communications connection(s) 518 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium. The system 500 may also include input device(s) 520 such as a keyboard, mouse, pen, voice input device, touch input device, etc., and output device(s) 522, such as a display, speakers, printer, etc. The system 500 may include a database hosted on the processor 502. All these devices are well known in the art and need not be discussed at length here.

CONCLUSION

Although embodiments for the identification of smart cards have been described in language specific to structural features and/or methods, it is to be understood that the subject of the appended claims are not necessarily limited to the specific features or methods described. Rather, the specific features and methods are disclosed as exemplary implementations.

What is claimed is:

1. A method comprising:
inserting a smart card into a plug and play system;
identifying a smart card minidriver corresponding to the smart card, wherein the identifying comprises:
issuing a get data command to the smart card, wherein the get data command commands the smart card to return a unique identifier comprising a version number, a vendor number, and a global unique identifier (GUID) that identifies a combination of the smart card and an application on the smart card; and
identifying the corresponding smart card minidriver based at least in part on the global unique identifier; and
loading the corresponding smart card minidriver identified based at least in part on the global unique identifier.

2. The method according to claim 1, wherein the GUID uniquely identifies the combination of the smart card and the application on the smart card.

3. The method according to claim 1, further comprising identifying the smart card minidriver corresponding to the smart card by reading an elementary file of an answer to reset (EF.ATR), if the smart card does not answer to the get data command.

4. The method according to claim 3, wherein the smart card is a contactless smart card.

5. The method according to claim 3, further comprising identifying the smart card minidriver corresponding to the smart card using a historical byte of the answer to reset (ATR), wherein the historical byte is extracted by parsing the ATR.

6. The method according to claim 1, wherein the identifying the corresponding smart card minidriver based at least in part on the unique identifier is performed if the smart card returns the unique identifier, the method further comprising:
identifying the smart card minidriver corresponding to the smart card based on an elementary file of an answer to reset (EF.ATR), if the smart card does not return the unique identifier.

7. A system comprising:
one or more processors;
a memory coupled to the one or more processors;
one or more smart card readers coupled to the processor and configured to establish a connection with one or more smart cards;
a smart card service manager maintained in the memory and executed by the one or more processors to identify one or more smart corresponding to the one or more smart cards, wherein the one or more smart card applications are identified utilizing a series of commands including a get data command, at least one smart card application of a particular smart card of the one or more smart cards identified based at least in part on a response to the get data command from the particular smart card, the response to the get data command comprising an identifier of a combination of the particular smart card and a respective smart card application of the smart card.

8. The system according to claim 7, wherein the one or more smart card applications comprise a cryptographic service provider.

9. The system according to claim 7, wherein the smart card service manager identifies a corresponding smart card minidriver based on a result of the series of commands.

10. The system according to claim 9, wherein the smart card service manager loads the identified corresponding smart card minidriver.

11. The system according to claim 10, wherein the response to the get data command comprises a 16-byte global unique identifier (GUID).

12. The system according to claim 9, wherein the smart card service manager identifies the corresponding smart card minidriver based on a historical byte of an answer to reset (ATR), if the smart card does not answer to the get data command.

13. The system according to claim 7, wherein the smart card service manager identifies a corresponding smart card minidriver based on a result of an EF.ATR command, if the smart card does not answer to the get data command.

14. The system according to claim 13, wherein the result of the EF.ATR command comprises a 16-byte GUID.

15. The system according to claim 14, wherein the smart card comprises a contactless smart card.

16. One or more computer-readable storage devices containing instructions that are executable by a computing device to perform actions comprising:
in response to a smart card being inserted into a system, identifying a smart card minidriver corresponding to the smart card, wherein the identifying comprises:
issuing a get data command to the smart card;
identifying the corresponding smart card minidriver based at least in part on a response to the get data command that comprises a unique identifier of a combination of the smart card and an application of the smart card; and loading the corresponding smart card minidriver.

17. The one or more computer-readable storage devices according to claim 16, wherein the response to the get data command comprises a 16-byte GUID.

18. The one or more computer-readable storage devices according to claim 17, issuing an elementary file of an answer to reset (EF.ATR) command if the smart card does not respond to the get data command, wherein the smart card comprises a contactless smart card.

19. The one or more computer-readable storage devices according to claim 16, wherein the application of the smart card comprises a cryptographic service provider.

20. The one or more computer-readable storage devices according to claim 16, further comprising identifying the smart card minidriver corresponding to the smart card using a historical byte of an answer to reset (ATR), wherein the historical byte is extracted by parsing the ATR.

* * * * *